(12) United States Patent
Du

(10) Patent No.: US 6,324,180 B1
(45) Date of Patent: Nov. 27, 2001

(54) ASYNCHRONOUS TRANSFER MODE LOCAL AREA NETWORK HAVING A RING STRUCTURE WITH WIRELESS TERMINALS

(75) Inventor: Yonggang Du, Aachen (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/920,750

(22) Filed: Aug. 29, 1997

(30) Foreign Application Priority Data

Sep. 7, 1996 (DE) .............................................. 196 36 394

(51) Int. Cl.⁷ .................................................. H04L 12/28
(52) U.S. Cl. ............................................. 370/395; 370/404
(58) Field of Search .................................... 370/395, 277, 370/396, 397, 404, 405, 338, 412

(56) References Cited

U.S. PATENT DOCUMENTS 5,495,484 * 2/1996 Self et al. ............................. 370/338
5,537,399 * 7/1996 Du ........................................ 370/396

FOREIGN PATENT DOCUMENTS

0660567A2 * 12/1994 (DE) ............................. H04L/12/28

OTHER PUBLICATIONS

Raychaudhuri et al.,"WATMnet: A Prototype Wireless ATM System for Multimedia Personal Communication", IEEE International Conference on Communications (ICC), US, New York, IEEE.

* cited by examiner

Primary Examiner—Huy D. Vu
Assistant Examiner—Alexander O. Boakye
(74) Attorney, Agent, or Firm—Gregory L. Thorne (57) ABSTRACT

The invention relates to a local area network operating in the asynchronous transfer mode (ATM) for transmitting cells, comprising a plurality of network interfaces (1 to 8) coupled to a ring by ring connections (29 to 32), each network interface including a switch (24). For providing a more flexible local area network, at least one network interface (1 to 8) includes a radio device (33) for exchanging data with at least one terminal (9 to 21) located in the radio coverage area of the network interface (1 to 8). For controlling the cell transport within a network interface, a switch (24) is provided.

6 Claims, 4 Drawing Sheets

ASYNCHRONOUS TRANSFER MODE LOCAL AREA NETWORK HAVING A RING STRUCTURE WITH WIRELESS TERMINALS

BACKGROUND OF THE INVENTION

The invention relates to a local area network operating in the asynchronous transfer mode (ATM) for transmitting cells, comprising a plurality of network interfaces coupled to a ring by ring connections, each network interface including a switch.

A local area network (LAN) operating in the asynchronous transfer mode is known from EP-0 641 105 A2. This network comprises a plurality of network interfaces which include each a transmit and a receive terminal, and stations coupled to the network interface by wires. Cells containing information about the destination, for example, of a certain station are transmitted by the ring formed in this manner. A network interface comprises a switch and a controller. The switch contains respective path memories which are assigned each to a receive connection. When a cell is received, the switch performs switching or coupling operations instructed by the switch modes based on the stored paths. For example, an incoming cell is transferred to the controller, to the station and/or to the ring. The controller is, for example, charged with connection set-up and disconnection operations.

When an asynchronous transfer mode is used in a system, payload information such as telephone, picture or sound signals are transmitted in fixed-length blocks via digital signal processing arrangements. A cell having a predetermined number of bytes (for example, 53 bytes) is denoted a fixed-length block. Each cell comprises a header field having a length of, for example, 5 bytes, and an information field in which the payload information is accommodated having a length of, for example, 48 bytes. In such a header field are contained address information, data for error detection and data for control indication bytes. Address information comprises a trunk identifier which is referenced VPI (Virtual Path Identifier), and a link identifier which is referenced a VCI (Virtual Channel Identifier). VPI and VCI together denote a virtual link or a virtual channel. A group of a plurality of virtual channels is denoted a virtual path, featured by the trunk identifier.

OBJECTS AND SUMMARY OF THE INVENTION

It is an object of the invention to provide a flexible local area network operating in the asynchronous transfer mode.

The object is achieved by an asynchronous transfer mode local area network of the type defined in the opening paragraph, in that at least one network interface comprises a radio device for exchanging data with at least one terminal situated in the radio coverage area of the network interface, and in that the switch is provided for transporting the cells at least between ring connections and the radio device.

According to the invention, one or more network interfaces include a radio device coupled to one or more terminals by a radio link. Certain other network interfaces may be connected to stations or other networks by wired connections. The network interfaces are then combined to a ring by one or a plurality of ring connections. The cells (ATM cells) available for radio transmission in a network interface or a terminal are given control indication bytes and additional information and sent to the radio link as one packet unit. The packet unit may then be part of a cell, a complete cell or a plurality of cells. Methods that may be used for radio transmission may be, for example, TDMA, FDMA or CDMA methods (TDMA=Time Division Multiple Access; FDMA=Frequency Division Multiple Access; CDMA= Code Division Multiple Access). The methods may also be combined, as appropriate. For example, a certain carrier frequency may be assigned to a network interface and to the terminals located in the radio coverage area of the network interface. The radio transmission between a network interface and the terminals may then be effected according to the time-division multiple access method.

The cells received in a network interface from the radio device or from the ring are transferred by the switch to the ring and/or to the radio device and/or to the control circuit. Signaling cells which are responsible, for example, for the connection set-up and disconnection, and user cells containing user information for an existing connection are then transferred. There are two types of cells available: a signaling cell and a user cell.

According to the invention, it is thus possible that various terminals are located in the radio coverage area of one network interface. They can be connected and disconnected at will, without further costly wired connections being provided, so that the local area network becomes flexible to the user. A user is, for example, a user of a program in a terminal, a program itself, stored data (terminal as a data bank), or a telephone user.

Each switch of a network interface includes a receive circuit assigned to a receive connection, which circuit evaluates the header field of a received cell. Based on the information from the header field, a receive circuit takes a switch mode from the assigned path memory arrangement.

Switch modes for various virtual links can be stored in the path memories. Six switch modes are provided for the path memories coupled to the radio device. A first switch mode is provided for a connection at least between two local terminals, in which mode the switch couples the receive and transmit connections connected to the radio device. A second switch mode is used for a connection at least between a local and a remote terminal, in which mode the switch couples the receive connection connected to the radio device and one transmit connection connected to a ring. A third switch mode is used for providing a connection between at least two local and at least one remote terminal, in which mode the switch couples the receive connection connected to the radio device to the transmit connection connected to the radio device and to a transmit connection connected to a ring. A fourth switch mode is used for a connection between a local terminal and the local controller, in which mode the switch couples the receive connection connected to the radio device to the local controller. A fifth switch mode is used for a connection between a local terminal and the local and at least one remote controller, in which mode the switch couples the receive connection connected to the radio device to the local controller and a transmit connection connected to a ring. In the sixth switch mode, cells containing non-existing connections are deleted.

The switch modes for a virtual link are stored during the connection set-up. A switch mode for a virtual link is stored in a path memory by the respective controller, The path memory is then provided for storing the type of connection, the type of cell and the switch mode while a virtual link is featured. The virtual link is featured by the combination of the VCI (Virtual Channel Identifier) and VPI (Virtual Path Identifier) contained in the header field of a cell. The type of the connection indicates whether a unicast connection i e. point-to-point connection, a multicast connection i.e. point-to-multipoint connection or broadcast connection is concerned.

A terminal includes, as does a network interface, a radio device with a radio frequency circuit, a modem and a protocol device. The radio device of a terminal exchanges data with the radio device of the associated network interface. A terminal transmits identification data by a recording channel, MAC signaling data (MAC=Medium Access Control) by a MAC signaling channel and payload information by at least one transport channel. The payload information contains at least part of a cell. The network interface informs the terminal by the MAC signaling channel, for example, the transport channel or channels appropriate for the transmission of payload information.

A network interface in the local area network has an additional object. It is the control of the connection set-up and disconnection of each virtual link. When a user wishes to have a connection to another user, this network interface verifies whether this is feasible.

The invention likewise relates to a local area network operating in the asynchronous transfer mode (ATM) for transmitting cells, which network interface is coupled to a plurality of network interfaces combined to a ring via ring connections and which have each a switch. The network interface includes a radio device for exchanging data with at least one terminal located in the radio coverage area of the network interface. The switch is provided for transporting cells at least between ring connections and the radio device.

These and other aspects of the invention will be apparent from and elucidated with reference to the embodiments described hereinafter.

DETAILED DESCRIPTION OF THE PREFERRED EMBODIMENTS

Figure 1:
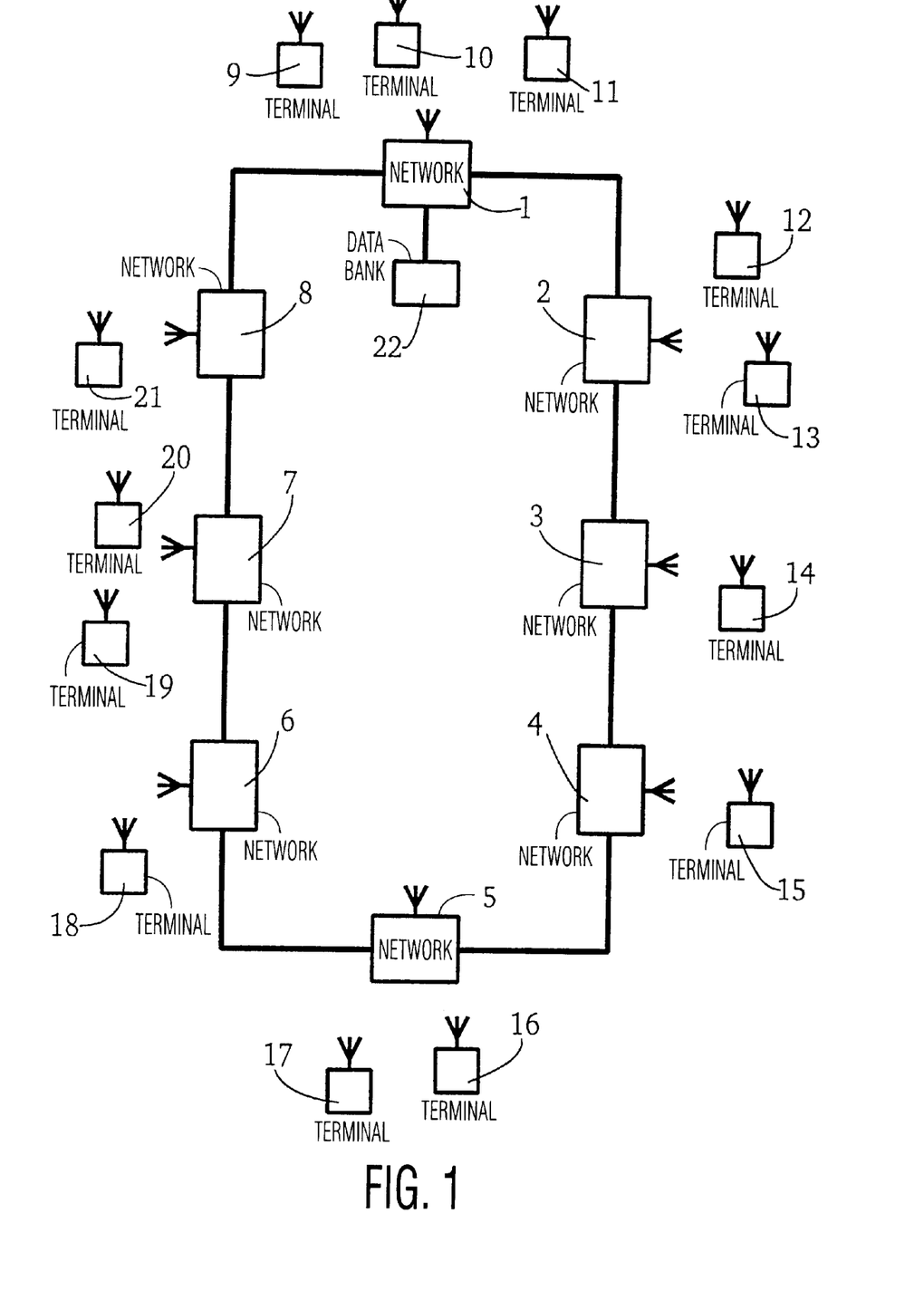
FIG. 1 shows a local area network.

FIG. 1 shows an embodiment for a local area network comprising 8 network interfaces 1 to 8 having each at least two ring connections for forming at least one ring. The local area network may also comprise one or various additional rings. When two rings are used, the information may flow through the rings in opposite directions.

Various terminals 9 to 21 are coupled to a network interface 1 to 8 by radio channels. A network interface 1 to 8 and a terminal 9 to 21 include each a radio device for transferring information or messages by the radio channels. In the embodiment shown in FIG. 1, the terminals 9, 10 and 11 are assigned to network interface 1, the terminals 12 and 13 to the network interface 2, the terminal 14 to the network interface 3, the terminal 15 to the network interface 4, the terminals 16 and 17 to the network interface 5, the terminal 18 to the network interface 6, the terminals 19 and 20 to the network interface 7 and the terminal 21 to the network interface 8.

A terminal 9 to 21 includes not only a radio device, but, for example, also a videophone, a personal computer, a workstation or a telephone.

Messages or information are transmitted in cells in the asynchronous transfer mode (ATM) between the network interfaces 1 to 8 within the ring. Parts of the cell or also one or a plurality of cells are transmitted by a radio channel between the terminals (9 to 21) and the assigned network interfaces (1 to 8). The parts of a cell or one or various cells are then extended with control indication bytes and additional information (overhead) necessary for the radio transmission.

A cell comprises a header field of, for example, 5 bytes and an information field of, for example, 48 bytes. The information contained in the header field of the cell is especially used for addressing and for executing switch functions.

The network interface 1 is also coupled to a data bank 22 from which, for example, data for a connection set-up can be taken, which data may provide information about the resources of the respective terminals 9 to 21, or about the network topology. The network interface 1 is then additionally provided for managing data and controlling the connection set-up and disconnection.

The radio transmission between a terminal (9 to 21) and an assigned an, network interface (1 to 8) may be executed according to a TDMA, FDMA or CDMA method (TDMA=Time Division Multiple Access; FDMA=Frequency Division Multiple Access; CDMA=Code Division Multiple Access). The methods may also be combined, as appropriate. For example, according to the TDMA method, a time slot of a frame is assigned to a terminal for a specific connection. The duration of one time slot could correspond to an integral part or to the duration of one or of a multiple of a cell plus additional control indication bytes and auxiliary information necessary for the radio transmission. Different carrier frequencies may be assigned to the network interfaces 1 to 8 and the assigned terminals (9 to 21). The requirements of the respective terminal determine the assignment of a time slot to a connection, for example, during the connection set-up from the network interface 1 and/or per time slot (frame). It is also possible to implement only the TDMA method for the whole local area network. One time slot (sub-frame) of a superframe is then assigned to one network interface.

Figure 2:
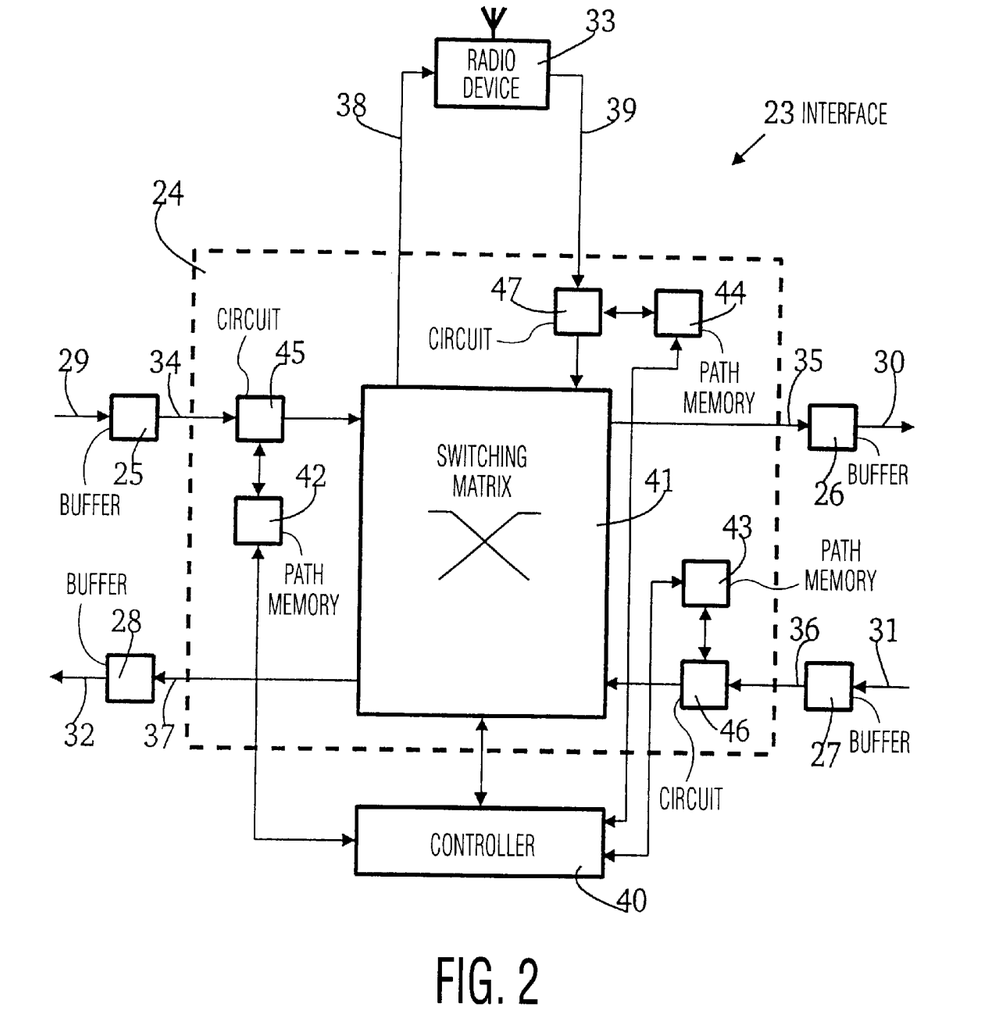
FIG. 2 shows a network interface which can be used in the local area network shown in FIG. 1.

A network interface 1 to 8 shown in FIG. 1, which forms a part of two oppositely directed rings and will be referenced 23 in the following, is shown in more detail in FIG. 2. In a local area network there may also be used network interfaces which form part of one ring or more than two rings. The network interface 23 includes a switch 24 which is coupled via buffer memories 25 to 28 to ring connections 29 to 32 and a radio device 33, and switches the cell stream. The radio device 33 is coupled to the switch 24 via the connections 38 and 39.

The buffer memory 25 is coupled, on the one hand, to the receive ring connection 29 of the first ring and, on the other hand, to a connection 34 leading to the switch 24. The buffer memory 25 receives a first receive clock signal which is derived from the cell stream of the receive ring connection 29, and an internal clock signal from a clock generator of the network interface 23. The buffer memory 26 is coupled to the switch 24 by a connection 35 and supplies a cell stream to the transmit ring connection 30 of the first ring. The internal clock signal and a first transmit clock signal which is derived, for example, from the internal clock signal, are applied to the buffer memory 26.

The buffer memory 27 receives a cell stream from the receive ring connection 31 of a second ring, and supplies a cell stream to the switch 24 by a connection Dow 36. The buffer memory 28 receives cells from a connection 37 of the switch 24, which cells are transferred to the transmit ring connection 32 of the second ring. The buffer memory 27 receives not only the internal clock signal, but also a second receive clock signal which is as derived from the cell stream of the receive ring connection 31. The internal clock signal and a second transmit clock signal which is derived, for example, from the internal clock signal, are applied to the buffer memory 28.

In the buffer memories 25 to 28, the cell stream is adapted to a clock signal. How various clock signals are derived from the cell stream and how the internal clock signal is generated in the clock generator, is not further shown here.

The network interface 23 further includes a controller 40 controlling the switch 24, which controller is used, for example, for the connection set-up and disconnection. The controller 40, which may be arranged as a microprocessor, receives and generates cells. The switch 24 further includes a switching matrix, three path memories 42, 43 and 44 and three receive circuits 45, 46 and 47. In the receive circuits 45, 46 and 47 are evaluated the header fields of cells coming in by connections 29, 31 and 39.

Address information contained in the header field is used for activating various Tables for the path memories 42, 43 and 44 connected to the receive circuits 45, 46 and 47. The data stored in the Tables are used by the receive circuits 45, 46 and 47 respectively, for organizing the further processing and transfer of the cell. For example, the receive circuit 45 can copy the cell and provide it with new address information. The original cell is transferred, for example, via the switching matrix 41 to the radio device 33 and the copied cell via the switching matrix 41 to the buffer memory 26. There is also the possibility of the switching matrix 41 carrying out functions such as this copy function.

The receive circuit 45 is coupled to the buffer memory 25 by the connection 34 and transports received cells to the switching matrix 41. The path memory 42 is connected to the receive circuit 45. The receive circuit 46, which is connected to the path memory 43, receives cells from the buffer memory 27 and transports cells to the switching matrix 41. Between the switching matrix 41 and the connection 39 is inserted the receive circuit 47 which is connected to the path memory 44.

Two types of payload cells are transmitted by the ring connections 29 and 30 of the first ring, by the ring connections 31 and 32 of the second ring and by the connections 38 and 39. On the one hand, user cells carrying, for example, messages or user data of a connection previously set up in their information field and, on the other hand, signaling cells carrying overhead bytes in their information field.

Certain bits in the header field of a cell are reserved for the VCI (Virtual Channel Identifier) and for the VPI (Virtual Path Identifier). The VPI indicates a group of virtual links. According to current standardization, 8 bits are reserved for the VPI in the a header field of the cell and 16 bits for the VCI.

In this embodiment, the VPI and the VCI together feature a virtual link between at least two users by one number, and the VPI and VCI are determined during the connection set-up. A user is understood to mean, for example, a user of a program in a terminal, a program itself, stored data (terminal as a databank) or also a telephone subscriber. Additionally, the VPI indicates a group of virtual links. When the connection is set up, certain attributes which are assigned to the connections featured by the VPI and VCI are stored in the Tables of the path memories 42 to 44. An attribute indicates, for example, the type of connection of a virtual link.

A type of connection is a unicast connection, a multicast connection or a broadcast connection. A unicast connection, or end-to-end connection, is a virtual link of a user of a first terminal to a user of a second terminal. A multicast connection, or point-to-multipoint connection, occurs when a plurality of users of terminals are connected to each other. With a broadcast connection, a transmitter terminal delivers cells having the same content in the information field to all other terminals.

Figure 3:
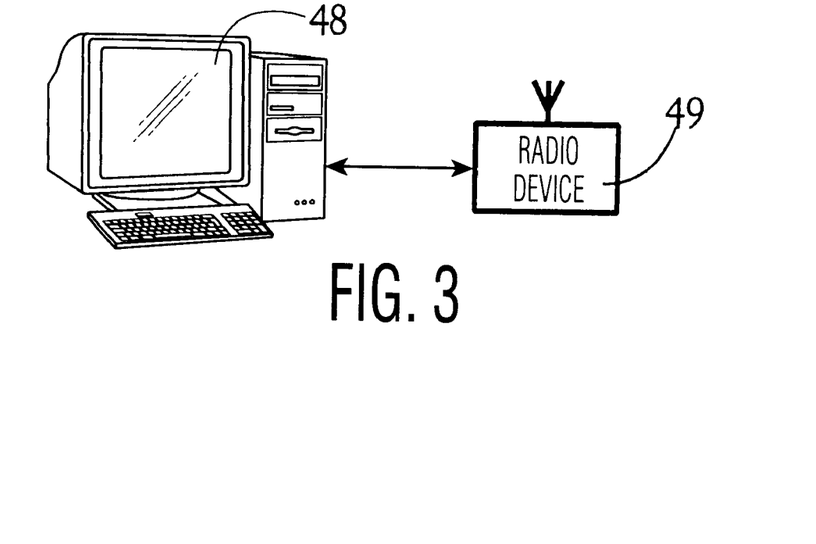
FIG. 3 shows a terminal coupled by a radio channel to a network interface shown in FIG. 2.

A terminal 9 to 21 may comprise, for example, a personal computer 48 and a radio device 49, as shown in FIG. 3. The personal computer 48 exchanges cells with the radio device 49 which is suitable for radio transmission to the associated network interface (1 to 8).

Figure 4:
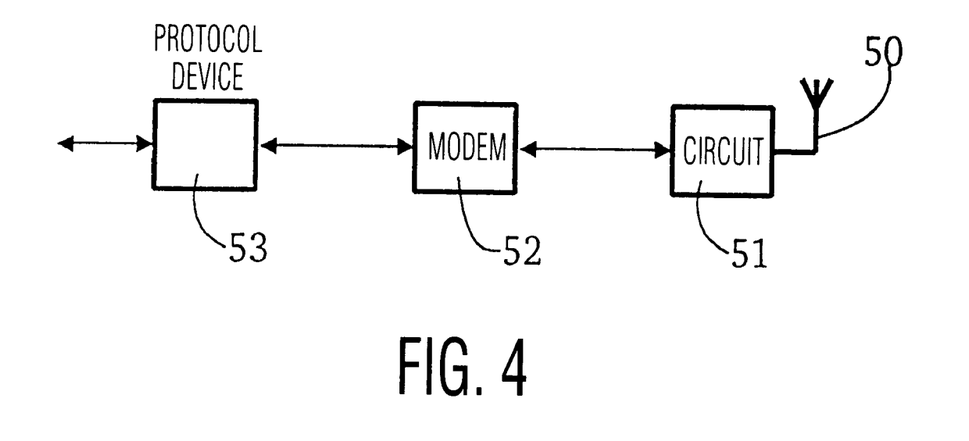
FIG. 4 shows a radio device in a network interface shown in FIG. 2 or in a terminal shown in FIG. 3.

The radio device 33 in the network interface 23 and the radio device 49 in a terminal (9 to 21) comprise an antenna 50, a radio frequency circuit 51, a modem 52 and a protocol device 53 (FIG. 4). Except for the protocol device 53, the other circuit elements 50 to 52 of the radio device 33 and 49 do not need further explanation, because they aye circuit elements known from other radio devices. The protocol device 53 forms packet units from the received ATM cell stream, which units contain each at least parts of an ATM cell and control indication bytes and uses error-reducing protocols suitable in a radio transmission medium for the multiple access. These protocols relate to the OSI layer model. The security layer of the OSI layer model is relevant here. It includes at least two further sub-layers: LLC and MAC layers. The MAC layer controls the Multiple ACcess of the terminals to the transmission medium (radio transmission medium). The LLC layer (LLC=Logic Link Control) performs a flow and error check. Further information about the MAC and LLC layer may be obtained, for example, from the title "Computer Networks" by Andrew S. Tanenbaum, Second Edition, Prentice-Hall International, Inc., 1988, pages 117 to 131, 196 to 212 and 262 to 265.

In the following, there is assumed that the data exchange between the terminals 9 to 21 and the network interfaces 1 to 8 takes place according to the TDMA and As the FDMA methods (Time-Division Multiple Access and Frequency-Division Multiple Access) on the radio channel. The network interfaces 1 to 8 and the assigned terminals 9 to 21 transmit data on different carrier frequencies (FDMA). Assigned time slots are used for the transmission of data between a network interface and an assigned terminal (TDMA). A frame includes a channel or time slot (in the following referenced registration channel) full of collisions, a plurality of collision-free MAC signaling channels or time slots for each terminal, and transport channels or transport time slots for payload information. The registration channel may be accessed by each terminal, so that collisions with other terminals may arise. A terminal, once it has switched on, is registered with the assigned network interface by the registration channel. A MAC signaling channel is fixedly assigned to a terminal and is used for exchanging the MAC signaling information between the terminal and the network interface. The MAC signaling information is derived from the protocol assigned to the MAC layer and is used for, for example, dynamically reserving the transport time slot for the payload information. The respective terminal then informs the network interface how many cells are available for transmission in a buffer. For example, in dependence on the buffer fill of transmit cells of the terminals located in the whole radio coverage area, the network interface assigns the transport channels to the respective terminals. The assignment is then generally renewed for each new time frame. Also the assignment for all the transport channels may be effected dynamically. This means that in a first frame, more channels are assigned to the transmission from the terminal to the network interface than channels are assigned to the transmission from the network interface to the terminal, and in another frame, more channels are assigned to the transport of cells from the network interface to the terminal than channels are assigned to the transmission from the network interface to the terminal. A method for a MAC signaling may be taken from, for example, the publication "Medium Access Control Protocol for wireless, transparent ATM access" by D. Petras, IEEE Wireless Communication Systems Symposium, Long Island, N.Y., pages 79 to 84, November 1995.

Once a terminal has been put into operation, it sends a registration request containing the identification number assigned to the terminal (ID number) to the assigned network interface (for example, network interface 5) by the registration channel. Once the registration request has been received in the radio device 33, the switch 24 sends this registration request on to the controller 40 after polling the path memory 44. The registration request of the terminal is sent in a signaling cell from the controller 40 of the network interface 5 via the ring to the network interface 1, which interface 1 stores the identification number of the terminal in the databank 22. The reception in the network interface 1 is acknowledged by means of a signaling cell sent to the controller 40 of the network interface 5 and then a further acknowledgement message is returned to the terminal. The terminal not only receives the acknowledgement message, but also the information about the assigned MAC signaling channel.

A controller 40 of a network interface controls the connection setup and disconnection of users of terminals. Similar control procedures to those described, for example, in European Patent Application EP 0 641 105 A2 are used here too.

In the following, the connection set-up between two users of terminals will be described by way of example. The terminal 18 assigned to the network interface 6 and having a user $A_1$ would like to set up a connection to a user $A_2$ of the terminal 12 assigned to the network interface 2.

There is assumed that the exchange of ATM cells (user and signaling cells) is realized by the radio channel between a terminal and the respective network interface via MAC signaling. The circuit arrangements of the MAC layer make said dynamic time slot assignment possible, irrespective of the contents of the ATM cells.

First, signaling cells containing a connection request are generated by the terminal 18 and transmitted via the network interfaces 6, 7 and 8 to the network interface 1. The controller 40 of the network interface 1 receives signaling cells having a connection request and then verifies whether such a connection is possible (for example, verifies whether terminal 12 is registered). If the connection is permitted, a VPI and VCI valid for the ring are assigned to this virtual link. By means of signaling cells, the network interface 1 announces to the controllers 40 of the network interfaces 2 and 6 that a virtual link between the terminals 12 and 18 is set up. Also the VPI and VCI assigned to the virtual link, and the transmission capacity reserved for the ring are announced. The respective controllers 40 of the network interfaces 2 and 6 are still to verify whether sufficient transmission capacity by the radio channel is available for the virtual link to the respective terminal 12 or 18. Sufficient transmission capacity is to be available on average for the radio channel for a connection. This capacity may vary, however, from one frame to the next. Circuit arrangements of the MAC layer are suitable for the dynamic time slot assignment by the radio channel. The network interfaces 2 and 6 inform their respective terminals 12 and 18 by radio channel of the VPI and VCI provided by the interfaces for the radio link for the connection. Thus, for the radio channel and the ring there may be assigned a different, but corresponding VPI and VCI.

Tables in certain path memories are still to be changed in the network interfaces 1 to 8. In the Tables, a certain switch mode is set for the VPI and VCI of the virtual link. This change of Tables is triggered by signaling cells which are transmitted by the network interface 1 and received and evaluated by the controllers 40 of the network interfaces 2 to 8. The actual change of Tables is effected by the controller of each network interface 1 to 8. For this purpose, the VPI and VCI assigned to the radio channel are stored in the path memory 44 and the VPI and VCI assigned to the ring are stored in the path memories 42 and 43.

For example, the network interface 6 conveys a cell received from terminal 18 to its associated transmit ring connection. The actual switching operation is executed by the switch 24 of the network interface 6, which interface conveys the cell stream received from the terminal 18, for example, to the send ring connection 30 of the network interface 6, after an evaluation of the Table in the path memory 44.

Figure 5A:
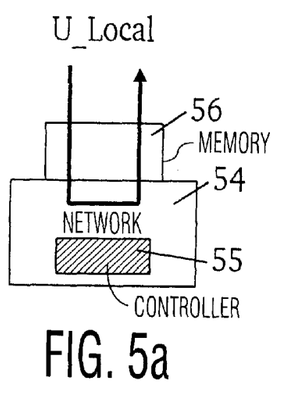
FIG. 5 shows various switch modes of a switch included in a network interface shown in FIG. 2.

Different switch modes are stored in the path memories 42 to 44 for the different types of connections, for the receiver of cells, and for the VPI and VCI. FIG. 5 shows the various switch modes which can be stored in the path memory 44. The cell stream relating to user cells is shown in an unbroken line and the cell stream relating to signaling cells is shown in a dashed line. FIG. 5a shows by way of example the network interface referenced 54, the controller contained therein referenced 55, and the radio device 33, the receive circuit 47 and the path memory 44 referenced 56.

FIG. 5a shows the switch mode "U_Local", in which user cells have been received from a terminal and which are returned via the switch 24 to the radio interface. In the following, a radio interface is generally denoted the radio channel with the respective suitable radio devices 33 and 49. This switch mode is used for all the user cells of a point-to-point or a point-to-multipoint connection. The terminals belonging to the connection are then located in the radio coverage area of the network interface (local area network interface) that performs the switch function.

Figure 5B:
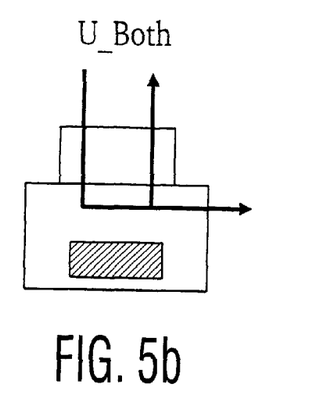

The switch mode "U_Both", shown in FIG. 5b, receives user cells from the radio interface, which user cells are fed to a send ring connection to be sent to another network interface and are returned to the radio interface. This switch mode is used for user cells in point-to-multipoint connections, in which mode at least one terminal belonging to the connection is located in the radio coverage area of the local area network interface and at least another terminal belonging to the connection is located in the radio coverage area of a different network interface. This switch mode is also necessary for a broadcast connection.

Figure 5C:
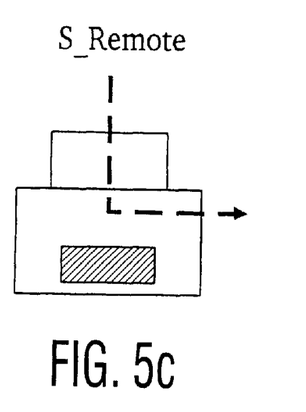

In the switch mode "S_Remote" shown in FIG. 5c, signaling cells which are received via the radio interface of one local area network interface are switched by the switch 24 to a send ring connection from which they reach a different network interface. This switch mode is used for signaling cells of a point-to-point connection in which a controller 40 of a different network interface is the receiver of the signaling cells. Also with a point-to-multipoint connection, in which various controllers 40 of different network interfaces are the receivers, the switch mode "S_Remote" is provided.

Figure 5D:
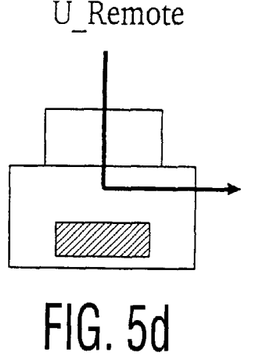

FIG. 5d shows the switch mode "U_Remote", which provides that user cells are conveyed from the radio interface to the send ring connection. This switch mode is used for user cells in a point-to-point or a point-to-multipoint connection. In the point-to-point connection, the receiving terminal is located in the radio coverage area of a network interface that does not perform the switching operation. In a point-to-multipoint connection, all the terminals receiving user cells are located in the radio coverage area of one or various different network interfaces.

Figure 5E:
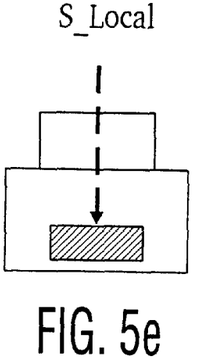
Figure 5F:
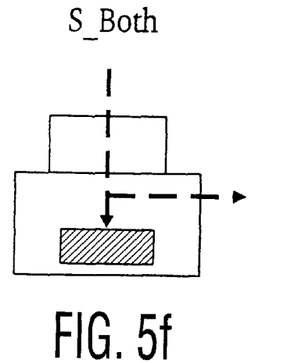

The FIGS. 5e and 5f relate to switch modes for signaling cells which come in via the radio interface of the local area network interface. In the switch mode "S_Local" shown in FIG. 5e, all the received signaling cells of a point-to-point or point-to-multipoint connection are conveyed to the controller 40 of the local area network interface. The switch mode "S_Both" shown in FIG. 5f is used in certain point-to-multipoint or broadcast connections. The signaling cells are then conveyed to the controller 40 of the local area network interface and to controllers 40 of different network interfaces.

Figure 5G:
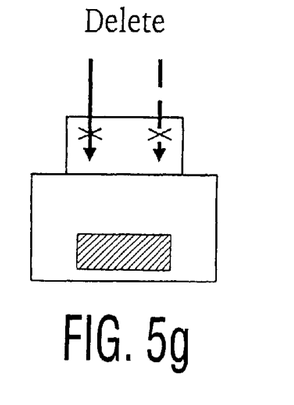

In the switch mode "Delete" shown in FIG. 5g, user or signaling cells in the switch 24 are deleted when they are neither to reach the terminals located in the radio coverage area of the local area network interface, nor to reach terminals located in different radio coverage areas.

The Table accommodated in the path memory 44 may now have the following entries:

| Receive location of the user(s) | Type of connection | Switch mode |
| --- | --- | --- |
| local terminal | Unicast/User cell | U_Local |
| various local terminals | Multicast/User cell | U_Local |
| remote terminal | Unicast/User cell | U_Remote |
| various remote terminals | Multicast/User cell | U_Remote |
| at least one local terminal and at least one remote terminal | Multicast/User cell | U_Both |
| irrelevant | Broadcast/User cell | U_Both |
| local controller | Unicast/Signaling cell | S_Local |
| local controller | Multicast/Signaling cell | S_Local |
| remote controller | Unicast/Signaling cell | S_Remote |
| all remote controllers | Multicast/Signaling cell | S_Remote |
| at least one local controller and at least one remote controller | Multicast/Signaling cell | S_Both |
| irrelevant | Broadcast/Signaling cell | S_Both |
| irrelevant | all non-existing connections | Delete |

The Table additionally has VPI and VCI entries (not shown here). For example, a first VPI and VCI entry may have a user of a local terminal as a point of reception, a unicast or point-to-point connection for a user cell as a type of connection, and "U_Local" as a switch mode. Furthermore, a VPI and VCI entry may have various users of the local controllers as its point of reception, a multicast or point-to-multipoint connection as a type of connection, and "S_Local" as a switch mode. It should be borne in mind, that specific predetermined VCI and VPI combinations are reserved for the connection set-up and disconnection for the signaling cell. The Table indicates the switch mode for all the existing points of reception and types of connection for cells which come in by the radio interface. A local terminal is understood to mean a terminal located in the radio coverage area of the local area network interface, and a remote terminal is understood to mean a terminal located in the radio coverage area of a different network interface. The local controller is the controller 40 of the local area network interface, and a remote controller is a controller 40 of a different network interface. It may still happen that, for example, a cell having an irrelevant VPI and VCI is received for a broadcast connection. In that case, the switch mode "U_Both" or "S_Both" respectively, is used for a user cell and signaling cell, respectively. For all non-existing connections having an irrelevant point of reception, the cells are deleted (switch a mode: "Delete").

What is claimed is:

1. A local area network operating in the a synchronous transfer mode (ATM) for transmitting cells, said network comprising a plurality of network interfaces coupled to a ring via ring connections, the network interfaces each including a switch and a radio device for exchanging data with any one of a plurality of terminals provided that said any one of the plurality of terminals is located in the radio coverage area of the network interface, and in that the switch is provided for transporting the cells at least between ring connections and the corresponding radio device, wherein the switch includes a receive circuit assigned to a receive connection, in that each received circuit is used for evaluating the header field of a received cell and in that on the basis of the information derived from the header field at least one receive circuit is used for extracting a switch mode from an assigned path memory, and wherein the path memory which is coupled to the receive connection coming from the radio device, stores a first switch mode for a connection at least between two local terminals, in which mode the switch couples the receive and transmit connections connected to the radio device, a second switch mode for a connection at least between a local and a remote terminal, in which mode the switch couples the receive connection connected to the radio device and one transmit connection connected to a ring, a third switch mode for providing a connection between at least two local and at least one remote terminal, in which mode the switch couples the receive connection connected to the radio device to the transmit connection connected to the radio device and to a transmit connection connected to a ring, a fourth switch mode for a connection between a local terminal and the local controller, in which mode the switch couples the receive connection connected to the radio device to the local controller, a fifth switch mode for a connection between a local terminal and the local and at least one remote controller, in which mode the switch couples the receive connection connected to the radio device to the local controller and a transmit connection connected to a ring, and a sixth switch mode for deleting cells which contain non-existing connections.

2. A local area network as claimed in claim 1, characterized in that for a connection set-up the controller stores the switch mode for a virtual link in at least one path memory.

3. A local area network as claimed in claim 2, characterized in that the VCI (Virtual Channel Identifier) and VPI (Virtual Path Identifier) contained in the header field of a cell together feature a virtual link and in that the path memory for storing the type of connection, the type of cell and the switch mode is included in this identifier.

4. A local area network as claimed in claim 1, characterized in that a network interface controls the connection set-up and disconnection.

5. A local area network operating in the asynchronous transfer mode (ATM) for transmitting cells, said network comprising a plurality of network interfaces coupled to a ring via ring connections, the network interfaces each including a switch and a radio device for exchanging data with any one of a plurality of terminals provided that said any one of the plurality of terminals is located in the radio coverage area of the network interface, and in that the switch is provided for transporting the cells at least between ring connections and the corresponding radio device, wherein each of said plurality of terminals has a radio device including a high-frequency circuit, a modem and a protocol device, in that the radio device of a terminal exchanges data with the radio device of the network interface that is located in the radio coverage area of the terminal and exchanges identification data by a registration channel, MAC signaling data (MAC=Medium Access Control) by a MAC signalization channel and payload information by at least one transport channel, and in that the payload information contains at least part of a cell.

6. A network for an asynchronous transfer mode (ATM) local area network for transmitting cells, said network comprising a plurality of network interfaces which each include a switch combined to a ring and coupled via ring connections, wherein each of the network interfaces include a radio device for exchanging data with at least one terminal located in the radio coverage area of the network interface and in that the switch transports cells at least between ring connections and the radio device, wherein only one of said network interfaces controls the connection set-up and disconnection for exchanging data, and wherein the network interface that controls the connection set-up and disconnection transmits the connection set-up and disconnection data to the other network interfaces utilizing the ring.

* * * * *